(12) United States Patent
Aponte et al.

(10) Patent No.: US 11,093,165 B2
(45) Date of Patent: Aug. 17, 2021

(54) SYSTEMS AND METHODS FOR DATA SANITIZATION OF ELECTRONIC STORAGE MEDIA

(71) Applicant: Dynamic Lifecycle Innovations, Inc., Onalaska, WI (US)

(72) Inventors: Rolly Aponte, Onalaska, WI (US); Casey Dingfelder, Onalaska, WI (US)

(73) Assignee: Dynamic Lifecycle Innovations, Inc., Onalaska, WI (US)

( * ) Notice: Subject to any disclaimer, the term of this patent is extended or adjusted under 35 U.S.C. 154(b) by 0 days.

(21) Appl. No.: 16/558,886

(22) Filed: Sep. 3, 2019

(65) Prior Publication Data

US 2020/0097206 A1 Mar. 26, 2020

Related U.S. Application Data

(60) Provisional application No. 62/726,368, filed on Sep. 3, 2018.

(51) Int. Cl.
*G06F 3/06* (2006.01)
*G06F 21/60* (2013.01)
(Continued)

(52) U.S. Cl.
CPC .......... *G06F 3/0652* (2013.01); *G06F 3/0604* (2013.01); *G06F 3/0653* (2013.01);
(Continued)

(58) Field of Classification Search
CPC .... G06F 3/0604; G06F 3/0623; G06F 3/0652; G06F 3/0653; G06F 3/0659;
(Continued)

(56) References Cited

U.S. PATENT DOCUMENTS 9,830,099 B1 * 11/2017 Johansson ............... G06F 21/79
2008/0178300 A1 * 7/2008 Brown ................ G06F 21/6218
726/29

(Continued)

OTHER PUBLICATIONS

LSoft Technologies Inc. KillDisk 11—User Manual. Nov. 15, 2017 (Year: 2017).*

(Continued)

*Primary Examiner* — Larry T Mackall

(57) ABSTRACT

A system is described herein comprising at least one application configured to run on one or more processors of a computing device for providing a data sanitization application, wherein the data sanitization application comprises identifying the device type and data capacity of a storage component. The data sanitization application comprises determining a health status of the storage component. The data sanitization application comprises initiating a data wipe of the storage component when the health status comprises a first state, wherein the data wipe comprises wiping data of the storage component using at least one data wipe method. The data sanitization application comprises auditing the data wipe by detecting data values of the storage component, the auditing including passing the data wipe when the detected data values meet at least one condition.

12 Claims, 13 Drawing Sheets

(51) Int. Cl.
*H04L 9/06* (2006.01)
*G06F 16/23* (2019.01)
*G06F 16/215* (2019.01)

(52) U.S. Cl.
CPC .......... *G06F 3/0659* (2013.01); *G06F 3/0676* (2013.01); *G06F 3/0679* (2013.01); *G06F 16/215* (2019.01); *G06F 16/2365* (2019.01); *G06F 21/602* (2013.01); *H04L 9/0631* (2013.01); *H04L 9/0643* (2013.01)

(58) Field of Classification Search
CPC .... G06F 3/0673; G06F 3/0676; G06F 3/0679; G06F 16/162; G06F 16/215; G06F 16/2365; G06F 21/123; G06F 21/602; G06F 21/78; G06F 2221/2143; H04L 9/0631; H04L 9/0643; H04L 9/0861; H04L 9/0897
See application file for complete search history.

(56) References Cited

U.S. PATENT DOCUMENTS

| | | | | |
|---|---|---|---|---|
| 2014/0297926 | A1* | 10/2014 | Ono | G06F 3/0653 711/103 |
| 2016/0087993 | A1* | 3/2016 | Jindal | G06F 16/955 726/1 |

OTHER PUBLICATIONS

Cropel. List of S.M.A.R.T. attributes. Apr. 9, 2012 (Year: 2012).*

* cited by examiner

WDC WD800HLFS-75G6U1, WD-WX20C7908021, 74.51 GB

Finalized — 802
14 days ago
Total Time — 804
15 minutes
Wipe Pattern — 806
NIST.SP.800-88
Percent Tested — 808
10
Status — 810
Healthy

App Version — 812
1.10
IP Address — 814
128.92.113.90
MAC Address — 816
3C-A9-F4-B7-AA-BC
SMART Report
smartctl 6.6 2016-05-31 r4324 [i686-linux-4.15.0-20-generic] (local build)
Copyright (C) 2002-16, Bruce Allen, Christian Franke, www.smartmontools.org === START OF INFORMATION SECTION ===
Model Family: Western Digital VelociRaptor — 820
Device Model: WDC WD800HLFS-75G6U1 — 822
Serial Number: WD-WX20C7908021 — 824
LU WWN Device Id: 5 0014ee 056f81f4b — 826
Firmware Version: 04.04V03 — 828
User Capacity: 80,000,000,000 bytes [80.0 GB] — 830
Sector Size: 512 bytes logical/physical — 832
Rotation Rate: 10000 rpm — 834
Device is: In smartctl database [for details use: -P show] — 836
ATA Version is: ATA8-ACS (minor revision not indicated) — 838
SATA Version is: SATA 2.5, 3.0 Gb/s — 840
Local Time is: Wed Aug 15 16:25:40 2018 UTC
SMART support is: Available - device has SMART capability.
SMART support is: Enabled

FIG. 4A

```
=== START OF READ SMART DATA SECTION ===
SMART Status not supported: Incomplete response, ATA output registers missing
SMART overall-health self-assessment test result: PASSED
Warning: This result is based on an Attribute check.
General SMART Values:
Offline data collection status: (0x82) Offline data collection activity
was completed without error.
Auto Offline Data Collection: Enabled.
Self-test execution status: ( 0) The previous self-test routine completed
without error or no self-test has ever
been run.
Total time to complete Offline
data collection: (1260) seconds.
Offline data collection
capabilities: (0x7b) SMART execute Offline immediate.
Auto Offline data collection on/off support.
Suspend Offline collection upon new
command.
Offline surface scan supported.
Self-test supported.
Conveyance Self-test supported.
Selective Self-test supported.
SMART capabilities: (0x0003) Saves SMART data before entering
power-saving mode.
Supports SMART auto save timer.
Error logging capability: (0x01) Error logging supported.
General Purpose Logging supported.
Short self-test routine
recommended polling time:  ( 2) minutes.
Extended self-test routine
recommended polling time:  ( 20) minutes.
Conveyance self-test routine
recommended polling time:  ( 5) minutes.
SCT capabilities: (0x303f) SCT Status supported.
SCT Error Recovery Control supported.
SCT Feature Control supported.
SCT Data Table supported.
```

FIG. 4B

SMART Attributes Data Structure revision number: 16
Vendor Specific SMART Attributes with Thresholds:
ID# ATTRIBUTE_NAME FLAG VALUE WORST THRESH TYPE UPDATED WHEN_FAILED RAW_VALUE
1 Raw_Read_Error_Rate 0x000f 200 200 051 Pre-fail Always - 1
3 Spin_Up_Time 0x0003 187 184 021 Pre-fail Always - 1608
4 Start_Stop_Count 0x0032 100 100 000 Old_age Always - 383
5 Reallocated_Sector_Ct 0x0033 200 200 140 Pre-fail Always - 0
7 Seek_Error_Rate 0x000e 200 200 000 Old_age Always - 0
9 Power_On_Hours 0x0032 081 081 000 Old_age Always - 14517
10 Spin_Retry_Count 0x0012 100 100 000 Old_age Always - 0
11 Calibration_Retry_Count 0x0012 100 100 000 Old_age Always - 0
12 Power_Cycle_Count 0x0032 100 100 000 Old_age Always - 381
192 Power-Off_Retract_Count 0x0032 200 200 000 Old_age Always - 86
193 Load_Cycle_Count 0x0032 200 200 000 Old_age Always - 442
194 Temperature_Celsius 0x0022 092 092 000 Old_age Always - 51
196 Reallocated_Event_Count 0x0032 200 200 000 Old_age Always - 0
197 Current_Pending_Sector 0x0012 200 200 000 Old_age Always - 0
198 Offline_Uncorrectable 0x0010 200 200 000 Old_age Offline - 0
200 Multi_Zone_Error_Rate 0x0008 200 200 000 Old_age Offline - 0
240 Head_Flying_Hours 0x0032 082 082 000 Old_age Always - 13644
241 Total_LBAs_Written 0x0032 200 200 000 Old_age Always - 9027339818
242 Total_LBAs_Read 0x0032 200 200 000 Old_age Always - 10252113166

SMART Error Log Version: 1
No Errors Logged

SMART Self-test log structure revision number 1
Num Test_Description Status Remaining LifeTime(hours) LBA_of_first_error
1 Short offline Completed without error 00% 14517 -
2 Short offline Completed without error 00% 14388 -
3 Short offline Completed without error 00% 14387 -
4 Short offline Interrupted (host reset) 10% 14378 -
5 Short offline Completed without error 00% 14374 -
6 Short offline Completed without error 00% 14374 -
7 Short offline Completed without error 00% 0 -

FIG. 4C

SMART Selective self-test log data structure revision number 1
SPAN MIN_LBA MAX_LBA CURRENT_TEST_STATUS
1 0 0 Not_testing
2 0 0 Not_testing
3 0 0 Not_testing
4 0 0 Not_testing
5 0 0 Not_testing
Selective self-test flags (0x0):
After scanning selected spans, do NOT read-scan remainder of disk.
If Selective self-test is pending on power-up, resume after 0 minute delay.

Back to List

FIG. 4D

SYSTEMS AND METHODS FOR DATA SANITIZATION OF ELECTRONIC STORAGE MEDIA

RELATED APPLICATIONS

The application claims the benefit of U.S. Application No. 62/726,368, filed Sep. 3, 2018.

TECHNICAL FIELD

The disclosure herein involves systems and methods for wiping data from electronic storage media.

BACKGROUND

Data erasure (sometimes referred to as data clearing, data sanitization, or data wiping) is a software-based method of overwriting data that aims to completely destroy all electronic data residing on a hard disk drive or solid state drive.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE DRAWINGS

FIG. 4A shows data of a hard drive, under an embodiment.

FIG. 4B shows data of a hard drive, under an embodiment.

FIG. 4C shows data of a hard drive, under an embodiment.

FIG. 4D shows data of a hard drive, under an embodiment.

DETAILED DESCRIPTION

Figure 1:
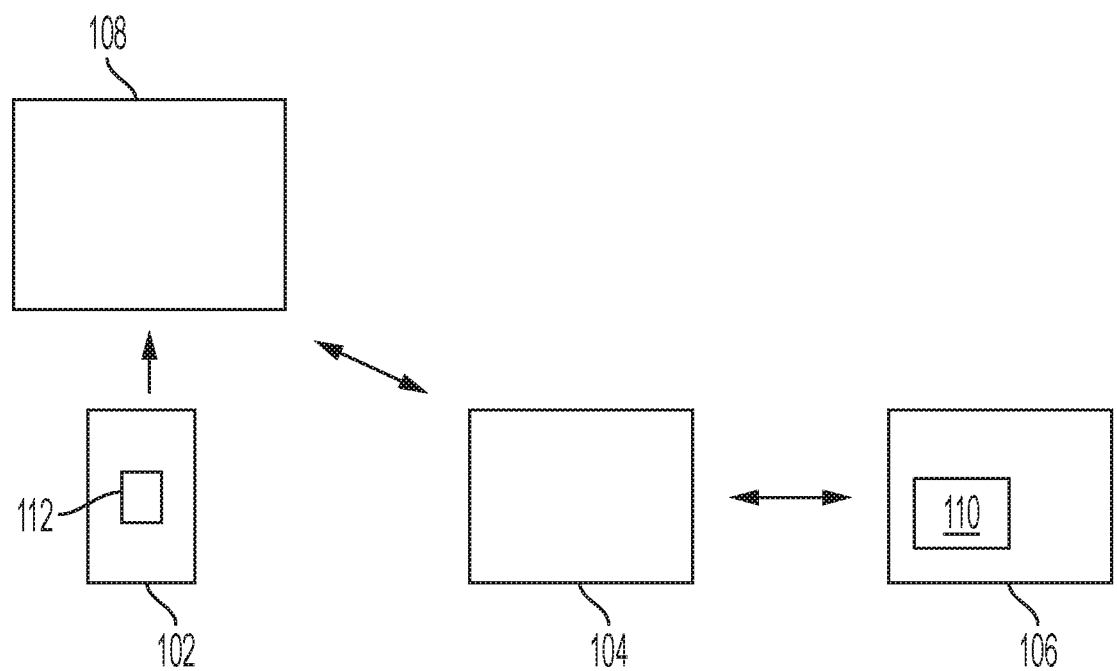
FIG. 1 shows an architecture of a data wipe/sanitization service, under an embodiment.

Systems and methods are described herein for wiping data from electronic devices. FIG. 1 illustrates the overall architecture of the devices and applications that provide the data wipe/sanitization service (also referred to herein as a data wipe/sanitization system). FIG. 1 shows a flash drive 102, a user portal 104, and at least one back end server 106 running one or more applications 110 in support of a data sanitization service. A user may log onto the portal 104 to sign up for the media sanitization service. FIG. 1 provides an example of the portal 104. The portal may comprise an HTML based web page. Alternatively, an application running on an operating system of a mobile device may access the portal. As one example of the data sanitization service, a user employer may use the portal to set up an account on behalf of user employer's company. As part of the set up process, an employer may specify any number of company employee users and may also purchase any number of licenses. Under one embodiment, the employer user may provide 10 employees with separate user accounts, i.e. each employee may receive a User Identification (User ID) and password. The employer user may then purchase a pool of 1,000 licenses. As further described below, each employee user may then initiate a data wipe process using the employee's corresponding User ID and password and draw upon the pool of licenses. Each use of the data sanitization service consumes one license under an embodiment.

The data sanitization service supports sanitization of hard disk drives (HDD) and solid state drives (SSD). Each drive type is described in greater detail with reference to FIGS. 5 and 6.

The user employees associated with an account may receive a flash drive. As seen in FIG. 1, the flash drive 102 comprises a data wipe application 112 (also referred to herein simply as the application). A data wipe application may comprise an application that implements a sanitization process or procedure in accordance with the Guidelines for Media Sanitization set forth in the National Institute of Standards and Technology Special Publication 800-88 (the "NIST Method"). A data wipe application may comprise an application that implements a sanitization process or procedure in accordance with the DoD 5220.22-M data sanitization method (the "DoD Method").

A data wipe application may comprise an application that combines multiple techniques, proven by $3^{rd}$ party chip off level forensics, to sanitize solid state drives (the "SSD Method"). Note that SSDs present additional challenges for data sanitization processes. The data sanitization process for SSDs comprises three initial steps (i) secure erase; (ii) whole disk encryption; and (iii) one-pass zeros.

As the first step, a firmware level secure erase command is issued to the target SSD. Drives that support the command secure erase then blank out the entire drive to factory defaults (0's) and the drive is erased. This command is managed by the SSD Controller, and is implemented by the drive manufacture. Effectiveness are verified by chip-off forensics (as further described below).

The drive is then encrypted using 256-bit AES encryption with SHA 512-bit key generation. All active data on the drive at this point will be encrypted upon process completion. (Any data that is swapped to cache after encryption will be encrypted). This process is strategically placed as the second step to ensure that if the SSD methodology fails to sanitize all data on the drive, any remaining data are encrypted.

The encryption key is saved externally onto a flash drive during the encryption process. Encryption keys can then be archived to provide proof of data erasure along with wipe logs.

The third step overwrites every addressable page with zeros. This step will take the cryptographic erasure process one step further by zeroing out the encrypted data left on the drive. It also provides a constant byte value to search for during the audit process.

SSD drives require chip-off forensics to thoroughly read all data on the drive. A SSD drive is comprised of a NAND flash controller IC and several NAND flash ICs. The NAND flash ICs have more storage than is advertised by the drive, this extra storage is used primarily as "spare blocks". The drive uses these spare blocks when other blocks go bad either prematurely or when they exceed their P/E cycle limits. This "spare" space in the NAND flash memory may only be accessed by the NAND flash controller, or by removing the NAND flash ICs and reading the data directly (bypassing the controller IC) via chip-off forensics.

Chip-off forensics accesses sections of an SSD that are normally not accessible by the user or operating system. This is achieved by bypassing the SSD controller. This process involves desoldering the NAND flash IC, connecting them to special IC sockets, and extracting a raw binary file from the NAND flash IC.

Continuing with the example of a data sanitization procedure, user employees associated with an account receive a flash drive for implementing a data sanitization process. The user employees may share access to a single flash drive or may each receive a flash drive for each individual user. Each user may then independently initiate a drive wipe procedure and draw from the corresponding pool of licenses. A user initiates such procedure by inserting the USB flash drive into computing device 108 (FIG. 1) which then boots from the flash drive. User IDs, passwords, and licenses are managed by one or more applications 110 running on at least one server 106 remote from end users. The one or more applications running on at least one server may comprise a cloud computing architecture under an embodiment. As further described below, the one or more backend applications 110 log data related to drives targeted for wipe processes and data generated during the wipe process. The one or more applications may store such data in a relational data base. The server and applications may under one embodiment comprise an SQL database.

Figure 2:
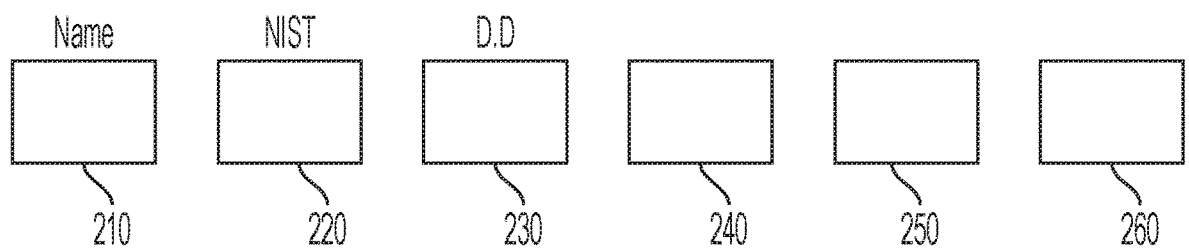
FIG. 2 shows an administrative portal, under an embodiment.

FIG. 2 illustrates an administrative view of user accounts. An administrator may use the interface of FIG. 2 to manage user accounts. FIG. 2 shows the name 210, number of drives wiped 220 using the NIST Method, number of drives wiped 230 using the DoD Method, number of drives wiped 240 using the SSD Method, and a check box 250 indicating whether the account is active. The administrator may select and manage users icon 260 to access another administrative page to view and manage additional account parameters. For example, an administrator may use this additional administrative interface to activate/deactivate accounts, confirm email addresses, export records (e.g. number and type of drives wiped and corresponding data) as comma-separated values (CSV), and sort administrative records by date. An administrator may use this additional administrative interface to manage Certificates of Destruction (COD). The administrative portal provides a downloadable certificate of destruction for each sanitized hard drive. A user my export a single COD for a single drive or multiple CODs for multiple drives using a list option to select multiple drives. The administrative interface also provides access to statistics including usage data. e.g. number of licenses consumed monthly by an end user. The statistics may also include information of onsite computing devices using the data sanitization service, data regarding wiped drives, and data regarding the outcome of each sanitization procedure (e.g., success or failure and other data logged during a sanitization procedure as further described below). An administrator may use the administrative interface to determine status of End User License Agreements (i.e. accepted/not accepted).

If an End User License Agreement is not accepted, the sanitization system (including server 106, applications 110, and data wipe application 112) prevents end users from implementing a data wipe session as further disclosed below. use The systems and methods for applying a data wipe/sanitization procedure to a target device including one or more hard drives is further described below. Note that the data wipe/sanitization procedure may be referred to as a data wipe/sanitization system as implemented through the architecture set forth in FIG. 1.

Figure 3A:
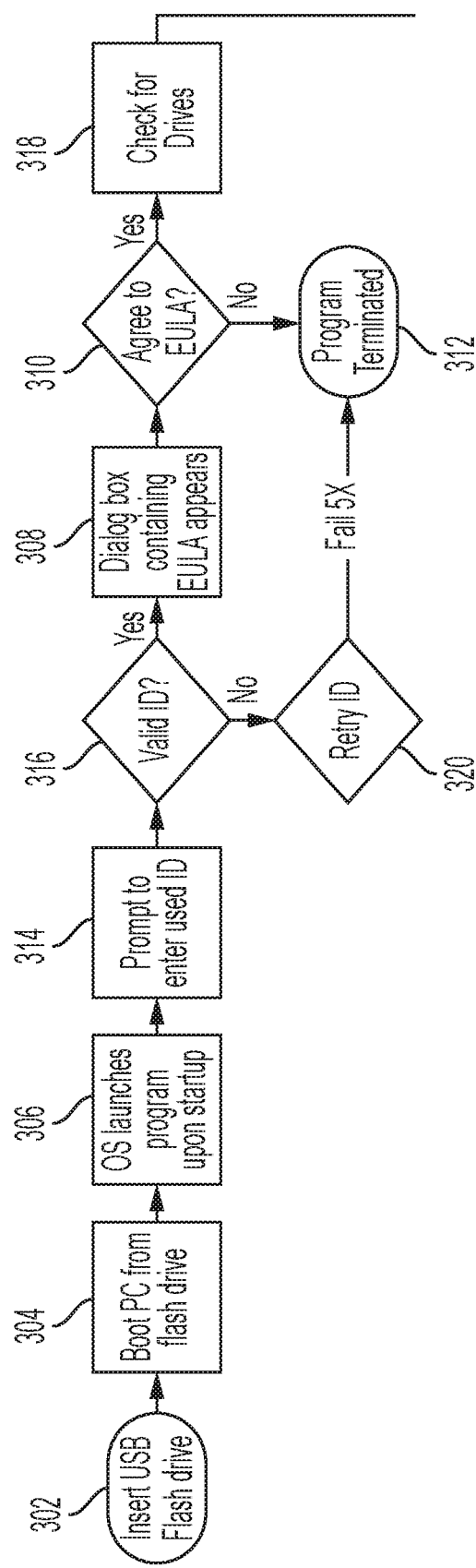
FIG. 3A shows a method for wiping data from electronic storage media, under an embodiment.

The method shown in FIG. 3A provides for initial insertion of a USB flash drive 302 into an end user's computer. The computer is then booted 304 from the flash drive. An operating system running on the at least one processor of the computer launches 306 the data wipe application upon startup. The end user receives a User ID and password during subscription to the data wipe services. The user is prompted to enter a User ID and password 314. The application communicates with backend servers/applications to validate 316 the User ID and password. If the end user enters an invalid ID and/or password, the user is given another opportunity to provide a valid ID and/or password 320. If an invalid ID is entered five times, then the data wipe application terminates 312. The application then presents 308 an End User License Agreement to an end user. If the user refuses the EULA, then the application terminates 312 and provides information of the refusal to backend servers/applications. If the end user accepts 310 the EULA, then the application checks for drives 318 as further described below.

The data wipe application checks for the number of drives 318 on the computing device. The data wipe application automatically detects and identifies drive type (SSD/HDD) 410, and capacity for each drive. (Note that the data wipe application supports sanitization of NVME SSD). For example, the application may identify hard drive FUJITSU MHZ2160BH FFS G1, K679T952E9L4 with a capacity of 149.05 GB. The application uses Linux commands to gather data on a PC or computing device wiping the drive. Note that this process identifies all hard drives operating within or connected to the device include backup storage media.

Figure 3B:
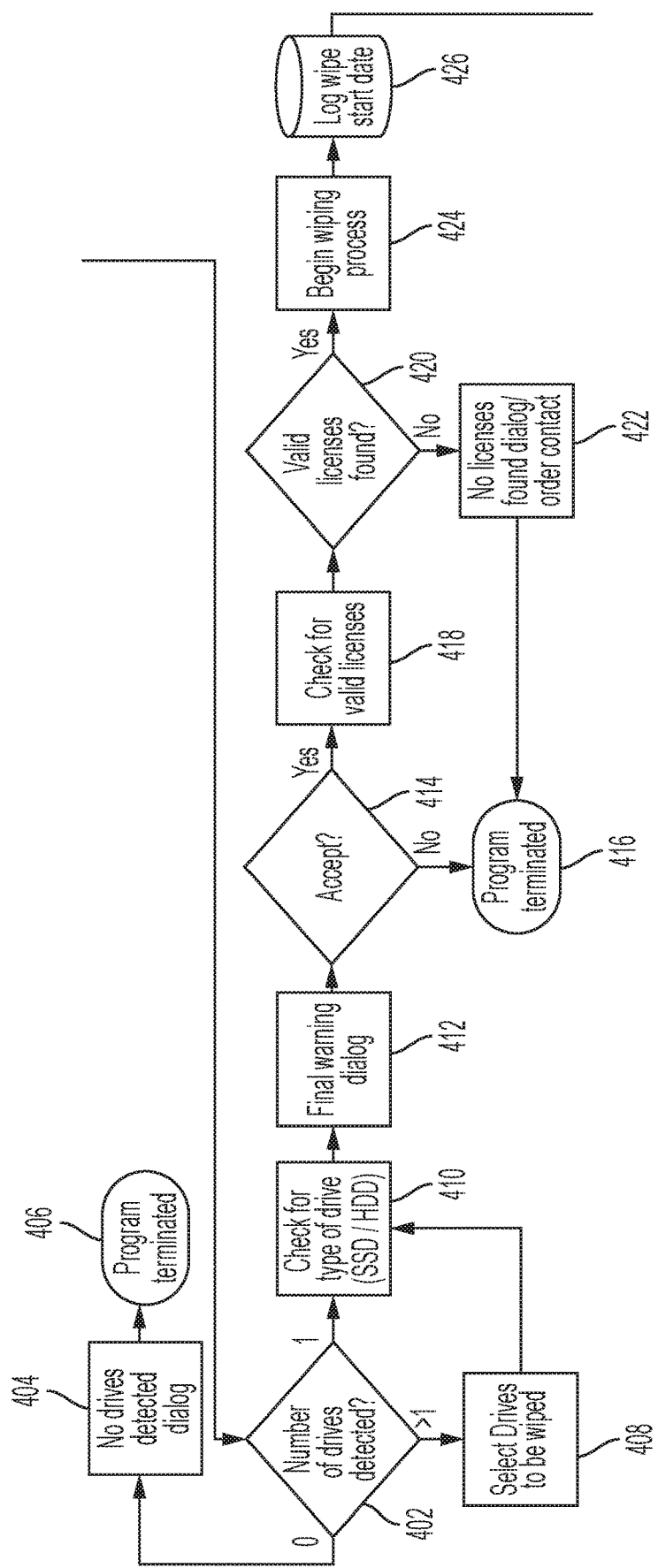
FIG. 3B shows a method for wiping data from electronic storage media, under an embodiment.

FIG. 3B shows that if no drives are detected 402, 404 then the data wipe program terminates 406. Alternatively, the data wipe application detects one or more drives 402, 408. If more than one drive 408 is detected, then an end user is provided an opportunity to select drives for application processing. Once drives are selected for data wipe procedures, the user is given a final warning dialog box 412. The user may accept 414 the warning, i.e. elect to initiate wipe procedures. If the user does not authorize the sanitization procedure, the process terminates 416. Once the procedure is authorized, the data wipe application communicates with backend servers/applications of the sanitization system to confirm the presence of a license 418, 420. If no license is found 422, the process terminates 416. If a valid license is found, the data application begins the sanitization process 424 including the step 426 of logging the wipe start date.

The logging of the wipe start date comprises the application communicating such date to the backend servers/application where the date is stored in a relational database. Continuing the workflow of a data sanitization process and with reference to FIG. 3C, the sanitization process then captures S.M.A.R.T. data 502, logs S.M.A.R.T. data/PC data 504, and checks pre-fail attributes 506. The S.M.A.R.T. data analysis provides detailed drive information as described below.

FIG. 4A shows key information re: the target drive including day wipe finalized 802, total time for sanitization process 804, wipe/sanitization method applied 806, percent tested 808 (i.e., the percentage of drive used for audit purposes), Status 810 (whether the drive passed the check pre-fail attribute process), version of the wipe application 812, IP address 814 of the device comprising the hard drive, and MAC address 816 of the device comprising the hard drive.

FIG. 4A, FIG. 4B, and FIG. 4C shows the results of a S.M.A.R.T. data capture process. The systems and methods describe herein may use smartmontools (www.smarmontools.org) to test the health of hard drives. Smartmontools (S.M.A.R.T. Monitoring Tools) is a set of utility programs (smartctl and smartd) to control and monitor computer storage systems using the Self-Monitoring, Analysis and Reporting Technology (S.M.A.R.T.) system built into most modern (P)ATA, Serial ATA, SCSI/SAS and NVMe hard drives. Smartmontools displays early warning signs of hard drive problems detected by S.M.A.R.T., often giving notice of impending failure while it is still possible to back data up.

FIG. 4A shows key drive information including
(820) Model Family: Western Digital VelociRaptor
(822) Device Model: WDC WD800HLFS-75G6U1
(824) Serial Number: WD-(810) WX20C7908021
(826) LU WWN Device Id: 5 0014ee 056f81f4b
(828) Firmware Version: 04.04V03
(830) User Capacity: 80,000,000,000 bytes [80.0 GB]
(832) Sector Size: 512 bytes logical/physical
(834) Rotation Rate: 10000 rpm
(836) Device is: In smartctl database (indicating that the device is in the smartmontools database)
(838) ATA Version is: ATA8-ACS (minor revision not indicated)
(840) SATA Version is: SATA 2.5, 3.0 Gb/s FIG. 4B and FIG. 4C show S.M.A.R.T test results for the following attributes.

| | | |
|---|---|---|
| 1 | Read Error Rate | Frequency of errors during read operations. |
| 3 | Spin-Up Time | Time required a spindle to spin up to operational speed. This parameter is not used with an SSD, because an SSD has no moving parts. |
| 4 | Start/Stop Count | Estimated remaining life, based on the number of spin-up/spin-down cycles. |
| 5 | Reallocated Sectors Count | The number of the unused spare sectors. When encountering a read/write/check error, a device remaps a bad sector to a "healthy" one taken from a special reserve pool. |
| 7 | Seek Error Rate | Frequency of the errors during disk head positioning. |
| 9 | Power-On Hours Count | Estimated remaining lifetime, based on the time a device was powered on. |
| 10 | Spin-up Retries | The Raw value of the attribute shows the number of unsuccessful attempts to spin a spindle up to operational speed. An SSD does not use this attribute. |
| 11 | Calibration Retries | A Raw value typically stores the number of unsuccessful read head and positioning system calibrations. |
| 12 | Power Cycle Count | Estimated remaining life, based on the number of power on/off cycles. |
| 192 | Power-Off Retract Cycles | The number of unexpected power outages when the power was lost before a command to turn off the disk is received. On a hard drive, the lifetime with respect to such shutdowns is much less than in case of normal shutdown. On an SSD, there is a risk of losing the internal state table when an unexpected shutdown occurs. |
| 193 | Load/Unload Cycles | The number of head movement cycles between the data zone and the head parking area or a dedicated unload ramp. |
| 194 | Temperature | Temperature, monitored by a sensor somewhere inside the drive. |
| 196 | Reallocation Events | The total number of reallocation events. This includes both off-line reallocations and reallocations during actual write operations. |
| 197 | Current Pending Sectors | The number of unstable sectors which are waiting to be re-tested and possibly remapped. |
| 198 | Off-line Uncorrectable | The number of bad sectors which were detected during offline scan of a disk. When idling, a modern disk starts to test itself, the process known as offline scan, in order to detect possible defects in rarely used surface areas. |
| 200 | Write Error Rate | Rate of errors during write. |
| 240 | Head Flying Hours | Time a disk head spent in the data zone, rather than in the parking area or on a head ramp. |
| 241 | Total LBAs Written | The total number of 512-byte sectors written during the entire lifetime of the device. |
| 242 | Total LBAs Read | The total number of 512-byte sectors read during the entire lifetime of the device. |

Note that test results for the above referenced attributes may be specific to the vendor of the tested hard drive, under an embodiment.

Pre-fail attributes are attributes of a disk that have been determined by the original equipment manufacturer (OEM) to be indicative of pending failure. Many pre-fail attributes vary by OEM, but the following are attributes that have been deemed "pre-fail" by an overwhelming percentage of OEMs. Those attributes include: read error rate, spin up time, reallocated sectors, seek error rate, and spin up retry count. A S.M.A.R.T. data test indicates failure if one of the reported values for an attribute exceeds or falls below a certain threshold.

The grading of S.M.A.R.T. data for SSDs is based off of the number of bad/reallocated blocks and percentage of spare blocks used. As a SSD drive is used it starts to wear. This is normal as a drive are rated for a certain amount of program & erase cycles (P/E cycles). As the drive approaches the rated P/E cycle count the drive is more likely to fail retrieving data from that block. When this happens the drive marks that block as "bad" and maps the data to one of the spare blocks. The S.M.A.R.T. data test grades according the percentage of blocks that are marked as "bad". An increasing number of "bad" blocks may present a threat as previous used data may reside in the bad blocks and may not be overwritten. This also shows that the drive has significant wear due to high usage.

Test results as seen in FIGS. 4B, 4C, and 4D indicate a healthy drive.

Figure 3C:
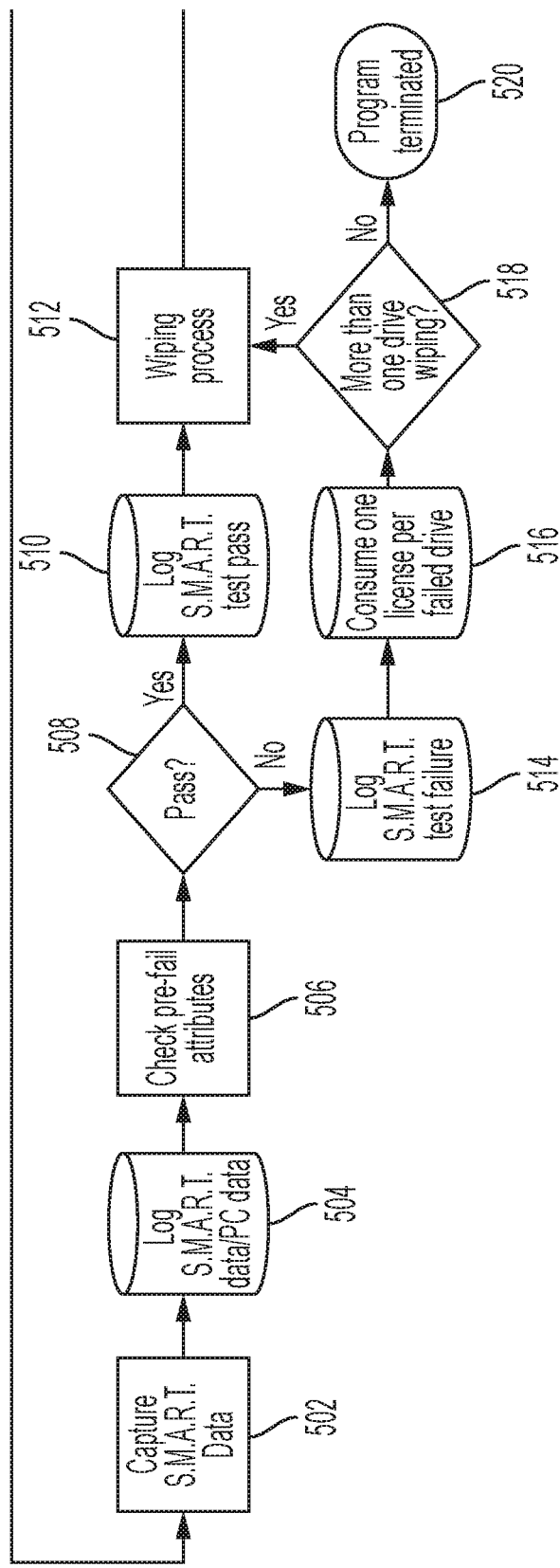
FIG. 3C shows a method for wiping data from electronic storage media, under an embodiment.

Continuing with reference to FIG. 3C, if the pre-fail attribute test passes the hard drive 508, the data wipe application logs the S.M.A.R.T. test as a pass 510, i.e. the application sends the data resulting from application of smartmontools to the backend servers/applications of the data sanitization system where the data is logged in a relational database under an embodiment. If the S.M.A.R.T. test fails 514 the drive, the process may consume a single license 516 and terminate the procedure 520 if no additionally selected hard drives remain 518. If any target drive passes the S.M.A.R.T. test, then the wiping process 512 begins. Under an alternative embodiment, the wiping process 512 proceeds irrespective of S.M.A.R.T test data results, i.e. irrespective of whether the drive passes or fails. The wipe/sanitization process comprises either the NIST Method, DoD Method, or SSD Method under an embodiment.

The data wipe procedure assesses whether the wipe procedure is successful or not. The wipe process overwrites all data of the drive from end to end using the NIST Method, the DoD method, or the SSD method. During the overwrite process, a magnetic domain may prevent the write/read head from properly writing to the drive, i.e. from magnetizing said domain. The write/read head detects this event as a write error indicating failure to overwrite data on the hard drive. The detection of a write error indicates a failed wipe process. Under one embodiment, a failure may require write errors over a specified threshold. Further, the drive may power down or overheat during the overwrite process. In either case, the overwrite process indicates a failure. Note that the evaluation described in this paragraph applies to magnetic heard drives and not to solid state drives.

Figure 3D:
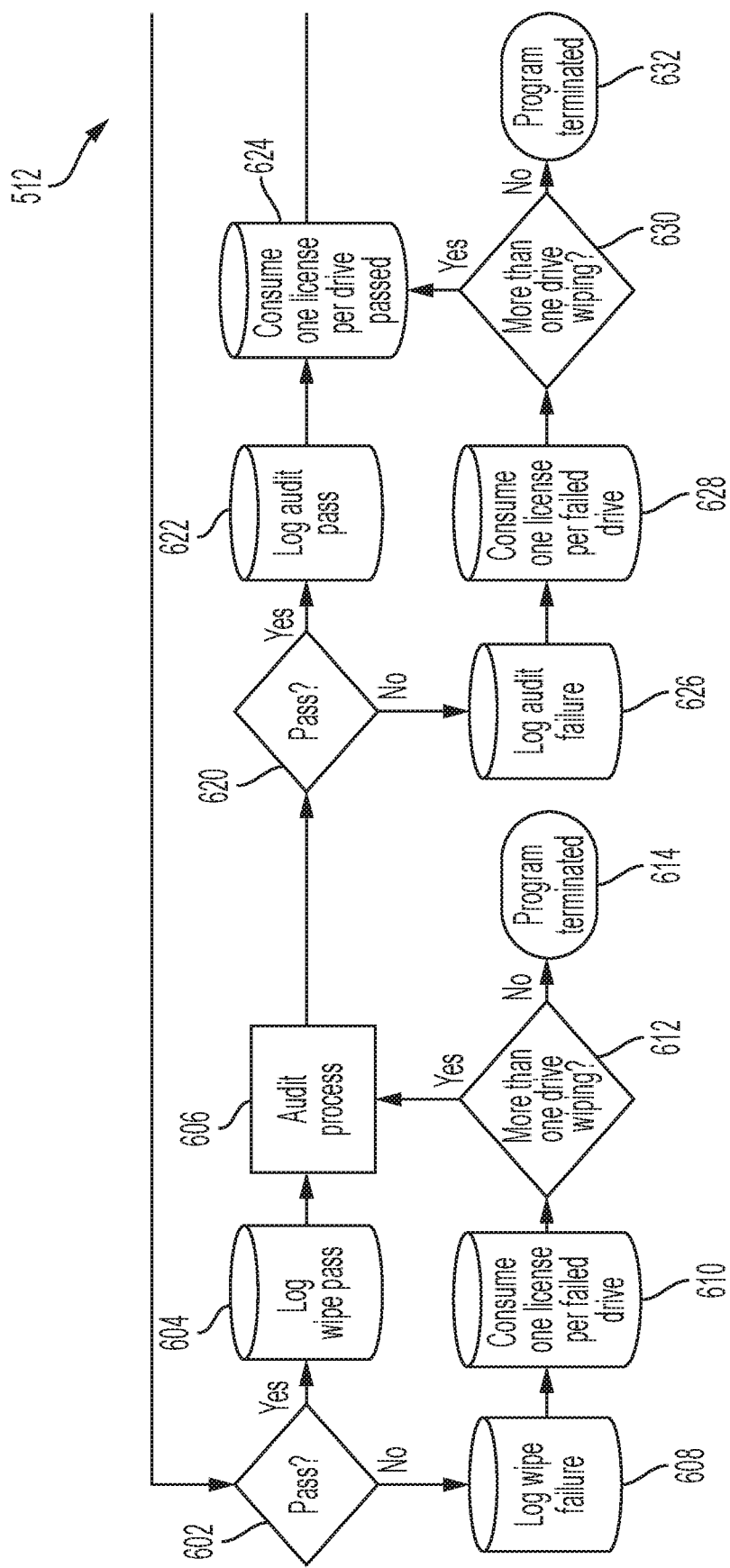
FIG. 3D shows a method for wiping data from electronic storage media, under one embodiment.

As seen in FIG. 3D, if the date wipe process "fails" 602 the data overwrite, then the application logs wipe failure 608 via communication with backend servers/applications and also instructs backend servers/applications to consume a license 610. The application then terminates 614 unless additional target hard drives remain 612 that successfully passed through the date overwrite process.

If the data wipe process "passes" 602 the data overwrite without error, then the application logs wipe pass 604 via communication with backend servers/applications, The application then conducts an audit 606. The audit process reads either a percentage of the wiped drive or the entire hard drive. The audit reads the drive for zeros and fails the drive if detecting anything other than a zero and passes the drive if detecting nothing but zeros, under an embodiment. Note that chip-off forensics are required to confirm this audit for solid state drive, i.e. to confirm the presence of zeros across the entire hard drive. Also note that the last pass data write may comprise different patterns that are then used to conduct the audit. If the audit indicates a pass 620, the data wipe application logs 622 the log audit pass, i.e. communicates the audit/validation confirmation data to the backend servers/applications where data is stored in a relational database. The application additionally communicates an instruction to backend servers/applications to consume a license 624. If the audit indicates a failure 626, the process consumes a license 628 and terminates the program 632 unless additionally selected hard drives remain 630 that survived audit.

Figure 3E:
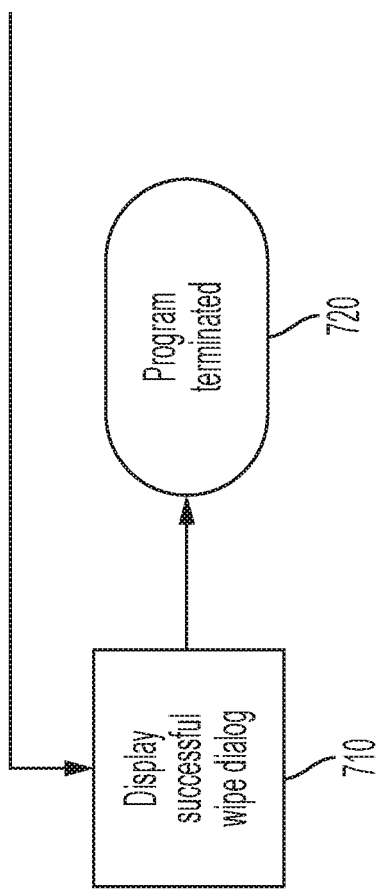
FIG. 3E shows a method for wiping data from electronic storage media, under one embodiment.

If the overwrite procedure survives audit, the application displays a successful wipe dialogue to the end user 710 and then terminates 720 as shown in FIG. 3E.

At the end of a data wipe application process, the client may return the drive to the company providing the data wipe service, under an embodiment. The client may then choose what happens to the drive. The drive may be resold or physically destroyed, under an embodiment.

Figure 5:
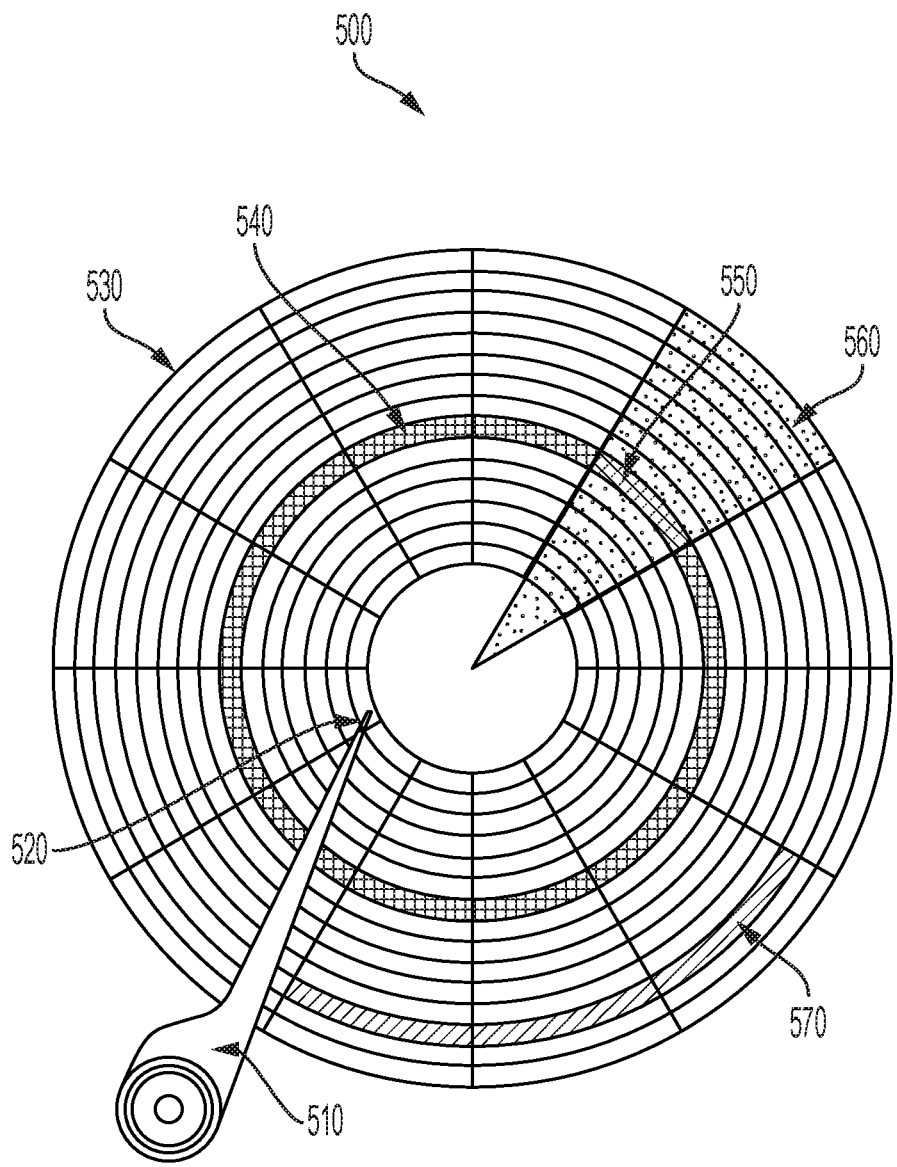
FIG. 5 shows memory structure of a hard disc drive, under an embodiment.

FIG. 5 shows memory structure of a hard disc drive 500, under an embodiment. FIG. 5 shows an actuator arm 510 and read/write head 520. FIG. 5 shows that a disc may comprise platters 530 which then includes tracks 540. A track is that portion of a disk which passes under a single stationary head 520 during a disk rotation, a ring 1 bit wide. A track is divided into segments of sectors 550, which is the basic unit of storage. FIG. 5 shows disc sectors 560 radially distributed across tracks. FIG. 5 also shows clusters 570. A cluster, in the context of a hard disk, is a group of sectors.

Figure 6:
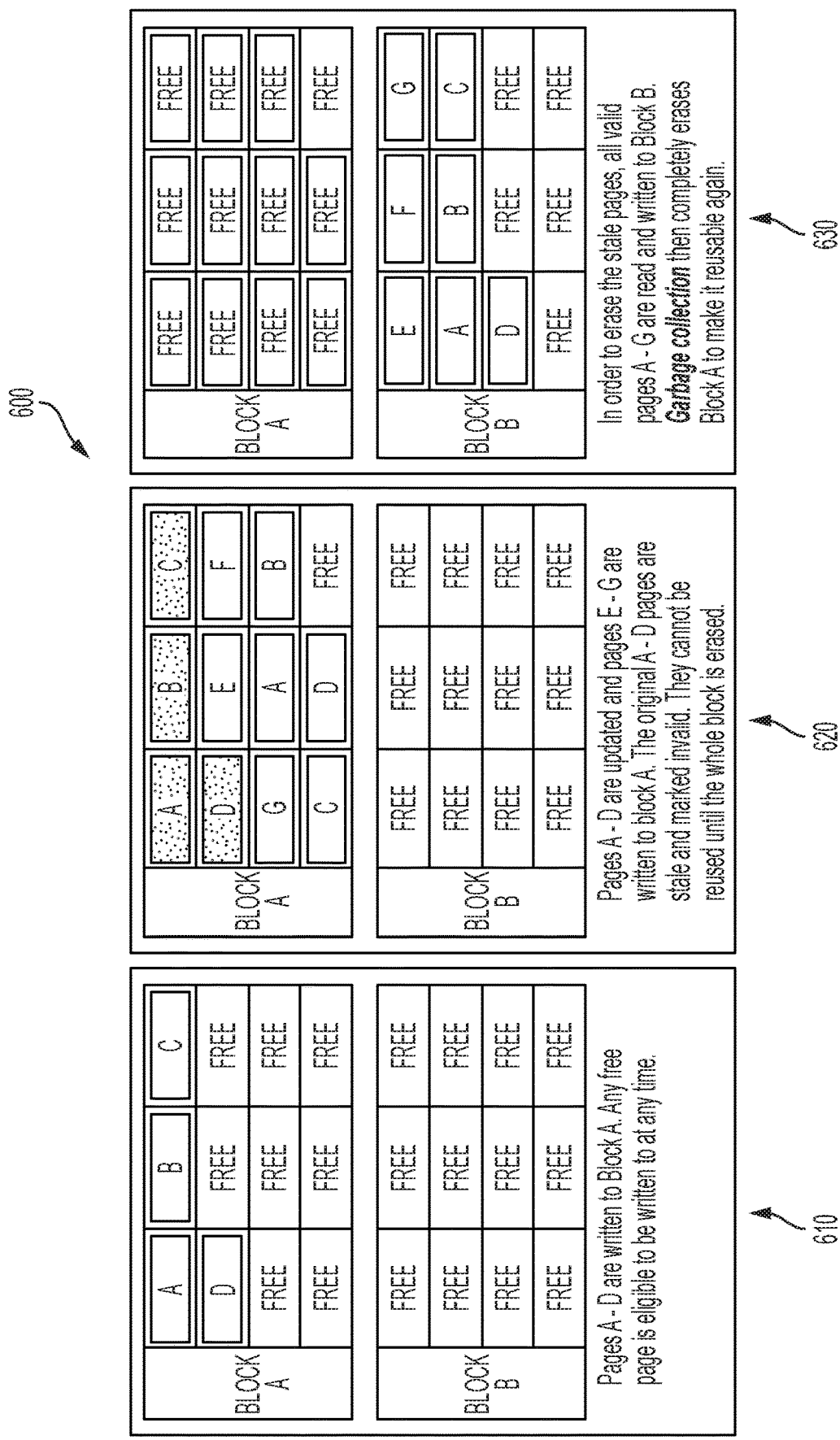
FIG. 6 shows memory structure of a solid state drive, under an embodiment.

Data is stored on hard drives linearly. Each sector may be overwritten without relocating the data contained within it. The drive can theoretically write and erase a sector infinitely. A File Allocation Table (FAT, or other file system) indexes empty and occupied space FIG. 6 shows memory structure of a solid state drive 600, under an embodiment. Data is stored in Pages—usually 4 KB (Smallest measure of data). Pages are collectively called a block—usually 128 pages to one block or 512 KB. Data is stored in blocks scattered amongst the NAND flash chips. All data is indexed by the Flash Translation Layer (FTL) to connect Physical Block address (PBA) to logical block addresses (LBA).

As shown in FIG. 6 (610) parts A-D are written to Block A. Any free page is eligible to be written to at any time. FIG. 6 (620) shows that Pages A-D are updated and pages E-G are written to block A. FIG. 6 (620) shows that the original A-D pages are stale and marked invalid. They cannot be reused until the whole block is erased. FIG. 6 (630) show that in order to erase the stale pages, all valid pages A-G are read and written to Block B. Garbage collection then completely erases Block A to make it reusable again.

A system is described herein that comprises under an embodiment a computing device and one or more applications running on at least one processor of a remote server, wherein the computing device and the one or more applications are configured to communicatively couple, wherein the computing device includes at least one electronic storage component, wherein the one or more applications is configured to write information to a database. The system includes at least one application configured to run on one or more processors of the computing device for providing a data sanitization application. The data sanitization application comprises identifying the device type and data capacity of a storage component of at least one electronic data storage component. The data sanitization application includes determining a health status of the storage component. The data sanitization application includes initiating a data wipe of the storage component when the health status comprises a first state, wherein the data wipe comprises wiping data of the storage component using at least one data wipe method. The data sanitization application includes auditing the data wipe by detecting data values of the storage component. The data sanitization application includes the auditing including passing the data wipe when the detected data values meet at least one condition.

The device type of the storage component comprises solid state drive, under an embodiment.

The at least one data wipe method of an embodiment comprises the at least one application implementing a firmware level secure erase command of the solid state drive, wherein the secure erase command returns the solid state drive to factory defaults of zero.

The at least one data wipe method of an embodiment comprises encrypting the solid state drive.

The encrypting comprises using 256-bit AES encryption with SHA 512-bit key generation, under an embodiment.

The encryption key is stored externally on a flash drive, under an embodiment.

The at least one data wipe method of an embodiment comprises overwriting every addressable page of the solid state drive with zeros.

The auditing includes using chip-off forensics to extract data inaccessible to an operating system of the computing device and exposing data across the entire solid state drive, under an embodiment, under an embodiment.

The detecting data values of the storage component includes detecting data values across the entire solid state drive, under an embodiment.

The meeting the at least one condition includes the detected data values across the entire solid state drive comprising zeros, under an embodiment.

The auditing includes transmitting information of the audited data wipe to the one or more applications, wherein the one or more applications stores the information of the audited data wipe in the database, under an embodiment.

The identifying includes transmitting the device type and the data capacity to the one or more applications, wherein the one or more applications stores the device type and the data capacity in the database, under an embodiment.

The determining the health status includes extracting data from the storage component using a data extraction tool, wherein the data extraction tool comprises smartmontools, the determining the health status including transmitting the extracted data to the one or more applications, wherein the one or more applications stores the extracted data in the database, under an embodiment.

The extracted data of an embodiment includes pre-fail attributes.

The pre-fail attributes of an embodiment include a percentage of available spare memory blocks of the solid state drive, wherein the health status comprises the first state when the percentage of used spare memory blocks is less than or equal to a designated value.

A system is describe herein that comprises under an embodiment a computing device and one or more applications running on at least one processor of a remote server, wherein the computing device and the one or more applications are configured to communicatively couple, wherein the computing device includes at least one electronic storage component, wherein the one or more applications is configured to write information to a database. The system includes at least one application configured to run on one or more processors of the computing device for providing a data sanitization application, the data sanitization application comprising identifying the device type and data capacity of a storage component of the at least one electronic data storage component. The data sanitization application includes determining a health status of the storage component. The data sanitization application includes initiating a data wipe of the storage component when the health status comprises a first state, wherein the data wipe comprises wiping data of the storage component using at least one data wipe method. The data sanitization application includes assessing validity of the data wipe by determining a number of write errors during the data wipe. The data sanitization application includes auditing the data wipe by detecting data values of at least a portion of the storage component when the assessed validity comprises a second state, the auditing including passing the data wipe when the detected data values comprise a third state.

The device type of the storage component comprises a hard disk drive, under an embodiment.

The assessing validity includes identifying the data wipe as valid if the number of write errors fall below a threshold value and as a failure otherwise, wherein the second state comprises the number of write errors falling below the threshold value comprises, under an embodiment.

The assessing validity includes transmitting information of the assessed validity to the one or more applications, wherein the one or more applications stores the information of the assessed validity in the database, under an embodiment.

The identifying includes transmitting the device type and the data capacity to the one or more applications, wherein the one or more applications stores the device type and the data capacity in the database, under an embodiment.

The at least one data wipe method of an embodiment comprises data sanitization implemented according to guidelines for media sanitization described in the National Institute of Standards and Technology Special Publication 800-88.

The at least one data wipe method of an embodiment comprises data sanitization implemented in accordance with a DoD 5220.22-M data sanitization method.

The at least one data wipe method of an embodiment comprises a final write of all zeros to all memory locations of the hard disk drive.

The third state indicates that all detected data values of the at least a portion of the storage component comprise zero, under an embodiment.

The auditing includes transmitting information of the audited data wipe to the one or more applications, wherein the one or more applications stores the information of the audited data wipe in the database, under an embodiment.

The determining the health status includes extracting data from the storage component using a data extraction tool, wherein the data extraction tool comprises smartmontools, the determining the health status including transmitting the extracted data to the one or more applications, wherein the one or more applications stores the extracted data in the database, under an embodiment.

The extracted data of an embodiment includes pre-fail attributes.

The pre-fail attributes of an embodiment include a read error rate, wherein the health status comprises the first state when the read error rate is less than a designated rate.

The pre-fail attributes of an embodiment include a spin up time, wherein the health status comprises the first state when the spin up time is less than a designated value.

The pre-fail attributes of an embodiment include a number of reallocated sectors, wherein the health status comprises the first state when the number of reallocated sectors is less than a designated value.

The pre-fail attributes of an embodiment include a seek error rate, wherein the health status comprises the first state when the seek error rate is less than a designated rate.

The pre-fail attributes of an embodiment include a spin up retry count, wherein the health status comprises the first state when the spin up retry count is less than a designated value.

Computer networks suitable for use with the embodiments described herein include local area networks (LAN), wide area networks (WAN), Internet, or other connection services and network variations such as the world wide web, the public internet, a private internet, a private computer network, a public network, a mobile network, a cellular network, a value-added network, and the like. Computing devices coupled or connected to the network may be any microprocessor controlled device that permits access to the network, including terminal devices, such as personal computers, workstations, servers, mini computers, main-frame computers, laptop computers, mobile computers, palm top computers, hand held computers, mobile phones, TV set-top boxes, or combinations thereof. The computer network may include one of more LANs, WANs, Internets, and computers. The computers may serve as servers, clients, or a combination thereof.

The systems and methods for data sanitization of electronic storage media can be a component of a single system, multiple systems, and/or geographically separate systems. The systems and methods for data sanitization of electronic storage media can also be a subcomponent or subsystem of a single system, multiple systems, and/or geographically separate systems. The components of systems and methods for data sanitization of electronic storage media can be coupled to one or more other components (not shown) of a host system or a system coupled to the host system.

One or more components of the systems and methods for data sanitization of electronic storage media and/or a corresponding interface, system or application to which the systems and methods for data sanitization of electronic storage media is coupled or connected includes and/or runs under and/or in association with a processing system. The processing system includes any collection of processor-based devices or computing devices operating together, or components of processing systems or devices, as is known in the art. For example, the processing system can include one or more of a portable computer, portable communication device operating in a communication network, and/or a network server. The portable computer can be any of a number and/or combination of devices selected from among personal computers, personal digital assistants, portable computing devices, and portable communication devices, but is not so limited. The processing system can include components within a larger computer system.

The processing system of an embodiment includes at least one processor and at least one memory device or subsystem. The processing system can also include or be coupled to at least one database. The term "processor" as generally used herein refers to any logic processing unit, such as one or more central processing units (CPUs), digital signal processors (DSPs), application-specific integrated circuits (ASIC), etc. The processor and memory can be monolithically integrated onto a single chip, distributed among a number of chips or components, and/or provided by some combination of algorithms. The methods described herein can be implemented in one or more of software algorithm(s), programs, firmware, hardware, components, circuitry, in any combination.

The components of any system that include the systems and methods for data sanitization of electronic storage media can be located together or in separate locations. Communication paths couple the components and include any medium for communicating or transferring files among the components. The communication paths include wireless connections, wired connections, and hybrid wireless/wired connections. The communication paths also include couplings or connections to networks including local area networks (LANs), metropolitan area networks (MANs), wide area networks (WANs), proprietary networks, interoffice or back-end networks, and the Internet. Furthermore, the communication paths include removable fixed mediums like floppy disks, hard disk drives, and CD-ROM disks, as well as flash RAM, Universal Serial Bus (USB) connections, RS-232 connections, telephone lines, buses, and electronic mail messages.

Aspects of the systems and methods for data sanitization of electronic storage media and corresponding systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods for data sanitization of electronic storage media and corresponding systems and methods include: microcontrollers with memory (such as electronically erasable programmable read only memory (EEPROM)), embedded microprocessors, firmware, software, etc. Furthermore, aspects of the systems and methods for data sanitization of electronic storage media and corresponding systems and methods may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that any system, method, and/or other components disclosed herein may be described using computer aided design tools and expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described components may be processed by a processing entity (e.g., one or more processors) within the computer system in conjunction with execution of one or more other computer programs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the systems and methods for data sanitization of electronic storage media is not intended to be exhaustive or to limit the systems and methods to the precise forms disclosed. While specific embodiments of, and examples for, the systems and methods for data sanitization of electronic storage media and corresponding systems and methods are described herein for illustrative purposes, various equivalent modifications are possible within the scope of the systems and methods, as those skilled in the relevant art will recognize. The teachings of the systems and methods for data sanitization of electronic storage media and corresponding systems and methods provided herein can be applied to other systems and methods, not only for the systems and methods described above.

The elements and acts of the various embodiments described above can be combined to provide further embodiments. These and other changes can be made to the systems and methods for data sanitization of electronic storage media and corresponding systems and methods in light of the above detailed description.

What is claimed is:

1. A system comprising,
a computing device and one or more applications running on at least one processor of a remote server, wherein the computing device and the one or more applications are configured to communicatively couple, wherein the computing device includes at least one electronic storage component, wherein the one or more applications is configured to write information to a database;
at least one application configured to run on one or more processors of the computing device for providing a data sanitization application, the data sanitization application comprising,
identifying device type and data capacity of a storage component of at least one electronic data storage component, wherein the device type of the storage component comprises solid state drive;
determining a health status of the storage component;
initiating a data wipe of the storage component when the health status comprises a first state, wherein the data wipe comprises wiping data of the storage component using at least one data wipe method, wherein the at least one data wipe method comprises the at least one application implementing a firmware level secure erase command of the solid state drive, wherein the secure erase command returns the solid state drive to factory defaults of zero, wherein the at least one data wipe method comprises encrypting the solid state drive;
auditing the data wipe by detecting data values of the storage component, the auditing including passing the data wipe when the detected data values meet at least one condition.

2. The system of claim 1, wherein the encrypting comprises using 256-bit AES encryption with SHA 512-bit key generation.

3. The system of claim 1, wherein the encryption key is stored externally on a flash drive.

4. The system of claim 1, wherein the at least one data wipe method comprises overwriting every addressable page of the solid state drive with zeros.

5. The system of claim 1, the auditing including using chip-off forensics to extract data inaccessible to an operating system of the computing device and exposing data across the entire solid state drive.

6. The system of claim 5, the detecting data values of the storage component including detecting data values across the entire solid state drive.

7. The system of claim 6, the meeting the at least one condition including the detected data values across the entire solid state drive comprising zeros.

8. The system of claim 7, the auditing including transmitting information of the audited data wipe to the one or more applications, wherein the one or more applications stores the information of the audited data wipe in the database.

9. The system of claim 1, the identifying including transmitting the device type and the data capacity to the one or more applications, wherein the one or more applications stores the device type and the data capacity in the database.

10. The system of claim 1, the determining the health status including extracting data from the storage component using a data extraction tool, wherein the data extraction tool comprises smartmontools, the determining the health status including transmitting the extracted data to the one or more applications, wherein the one or more applications stores the extracted data in the database.

11. The system of claim 10, wherein the extracted data includes pre-fail attributes.

12. The system of claim 11, wherein the pre-fail attributes include a percentage of available spare memory blocks of the solid state drive, wherein the health status comprises the first state when the percentage of used spare memory blocks is less than or equal to a designated value.

* * * * *